M. A. EDSON.
RADIATOR HEATER.
APPLICATION FILED FEB. 23, 1911.
1,018,414.
Patented Feb. 27, 1912.
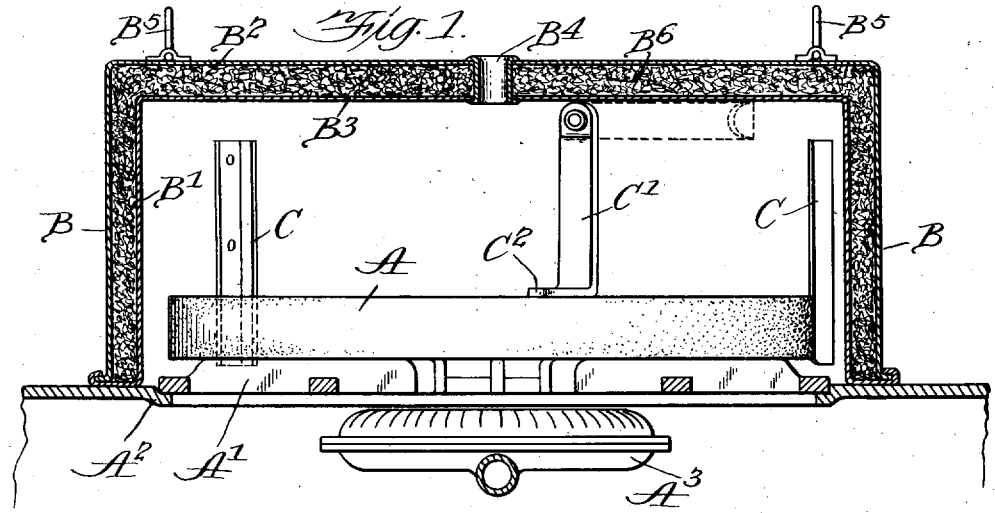
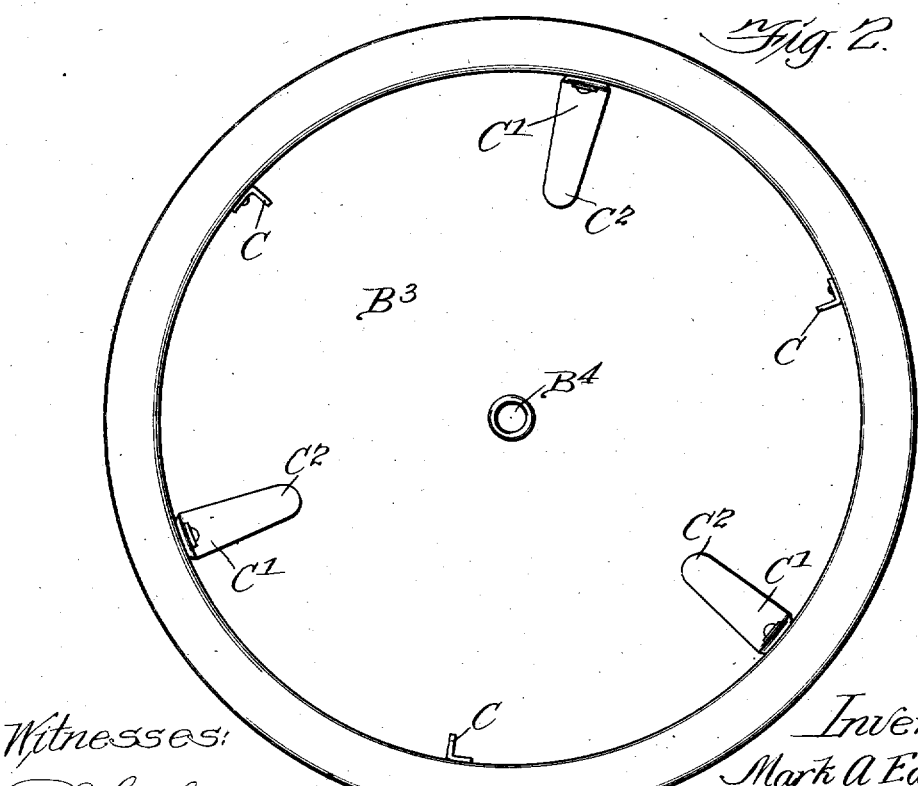
Witnesses:
P. J. Gathmann
Minnie M. Lindenau
Inventor:
Mark A Edson
By Parker & Carter
Attorneys

UNITED STATES PATENT OFFICE.

MARK A. EDSON, OF JANESVILLE, WISCONSIN, ASSIGNOR TO THE CALORIC COMPANY, OF JANESVILLE, WISCONSIN, A CORPORATION OF WISCONSIN.

RADIATOR-HEATER.

1,018,414.     Specification of Letters Patent.     Patented Feb. 27, 1912.

Application filed February 23, 1911. Serial No. 610,308.

*To all whom it may concern:*

Be it known that I, MARK A. EDSON, a citizen of the United States, residing at Janesville, in the county of Rock and State of Wisconsin, have invented a certain new and useful Improvement in Radiator-Heaters, of which the following is a specification.

My invention relates to improvements in radiator heaters and has for one object to provide heat retaining or insulating means to permit radiators for fireless cookers to be easily and rapidly heated.

It is illustrated diagrammatically in one form in the accompanying drawing, wherein—

Figure 1 is a section through the radiator with parts in elevation; Fig. 2 is a bottom view.

Like parts are indicated by like letters throughout both the figures.

The radiator $A$ which may be made of soap stone or any other suitable radiating material is supported upon the radially arranged bars $A^1$ carried by the stove casing $A^2$ and located above the gas burner $A^3$. The heater or insulating casing which is made up of the spaced outer and inner cylindrical walls $B$, $B^1$ and the outer and inner top walls $B^2$, $B^3$ carried respectively by the walls $B$, $B^1$, is provided with any suitable insulating lining or dead-air space containing material $B^6$, rests upon the stove casing $A^2$ and incloses the radiator. The collar $B^4$ located centrally within the top walls $B^2$ and $B^3$, connects them and provides a vent from the interior of the casing. The handles $B^5$ are mounted upon the wall $B^2$ to permit handling and moving of the casing. The vertical baffle plates $C$ are located at spaced intervals about the inner side of the casing and are adapted to hold the radiators in central position therein and prevent their being brought in contact with the walls thereof and also to act as a guide for heated vapors and gases passing up within the casing and about the radiators. The pivotally mounted legs or brackets $C^1$ provided with the outwardly extending projections $C^2$ are rotatably mounted upon the interior of the casing between the baffle plates and may be used to support the casing upon the radiator when the shape of the stove does not permit the casing to be carried upon it.

It will be evident that while I have shown in my drawings an operative device still many changes might be made in the size, shape and arrangement of the parts without departing materially from the spirit of my invention. Any desired form of heating means may be used to heat any suitable radiator in connection with my heater and many changes might be made in the heater itself without departing materially from the spirit of my invention.

The use and operation of my invention are as follows: The radiator is placed upon the stove or other heating unit, one or more radiators being used. If more than one are used they are piled one on top the other. The heater or insulating casing is then dropped upon the radiators until it rests upon the stove body or until the pivotally mounted legs are brought into contact with the top of the radiator. The baffle plates about the periphery of the heater compel a correct positioning of the radiators and prevent them from coming into contact with the casing, thereby permitting the passage of the flame or heated gases about all sides thereof. The centrally located perforation in the top of the casing permits the passage of the heat and flame outwardly and upwardly and causes a draft up through the heater and over the top of the radiator, thus heating the radiators evenly on top, bottom and sides and preventing to a very great extent any loss or waste of the heat, and thus materially increasing the speed with which the heating takes place.

I claim:

A radiator heater comprising a cylindrical casing open at the bottom and having spaced walls insulated one from the other an open thimble interposed between said walls at the center of one side vertically disposed baffle plates on the interior thereof and pivotally mounted brackets interposed between said baffle plates and adapted to support the casing on the radiator when the shape of the stove does not permit the casing to be carried upon it.

Signed at Janesville, Wisconsin, this 17th day of February, 1911.

MARK A. EDSON.

Witnesses:
MARLIN N. BAKER,
W. D. HODSON.

Copies of this patent may be obtained for five cents each, by addressing the "Commissioner of Patents, Washington, D. C."